United States Patent [19]

Tasto et al.

[11] 4,445,229
[45] Apr. 24, 1984

[54] DEVICE FOR ADJUSTING A MOVABLE ELECTRO-ACOUSTIC SOUND TRANSDUCER

[75] Inventors: Manfred Tasto, Henstedt-Ulzburg; Michael Kuhn, Hamburg; Herbert Piotrowski, Oersdorf; Horst Tomaschewski, Stuvenhorn; Rudolf Geppert; Hermann Ney, both of Hamburg, all of Fed. Rep. of Germany

[73] Assignee: U.S. Philips Corporation, New York, N.Y.

[21] Appl. No.: 237,053

[22] Filed: Feb. 23, 1981

[30] Foreign Application Priority Data

Mar. 12, 1980 [DE] Fed. Rep. of Germany ....... 3009404

[51] Int. Cl.³ .............................................. H04M 1/00
[52] U.S. Cl. ....................................... 381/110; 381/42
[58] Field of Search ........... 179/1 DD, 1 DM, 1 MG, 179/1 HF, 1 VC, 2 D, 2 TV, 121 D, 100 L; 358/85; 350/319; 381/78, 91, 92, 122, 75, 42, 110; 367/198

[56] References Cited

U.S. PATENT DOCUMENTS

| | | | |
|---|---|---|---|
| 3,116,365 | 12/1963 | Prescott | 358/85 |
| 3,495,908 | 2/1970 | Rea | 358/85 X |
| 3,532,815 | 10/1970 | Torok | 358/85 |
| 3,544,715 | 12/1970 | Herriott et al. | 358/85 |
| 3,567,848 | 3/1971 | Thies et al. | 179/2 TV X |
| 3,755,623 | 8/1973 | Cassagne | 358/85 |
| 3,970,792 | 7/1976 | Benham et al. | 179/2 TV |
| 4,139,734 | 2/1979 | Fincham. | |

Primary Examiner—A. D. Pellinen
Assistant Examiner—Keith E. George
Attorney, Agent, or Firm—Robert T. Mayer; Bernard Franzblau

[57] ABSTRACT

In a device for adjusting a movable electro-acoustic sound transducer, an optical duct is connected to the sound transducer which only allows an object, such as a display table or a data display unit, to be viewed completely in one specific position. This position is unambiguously reproducible and so is the position of the sound transducer or microphone relative to the mouth of the speaker. The optical duct may comprise diaphragms or a tube, possibly with intermediate walls, or a phase amplitude grating.

The object may be a display unit and the device further comprises a device for generating variable data on the display. If used for speaker identification, the variable data generator projects consecutive instructions on the display so that, the speech recognition process is controlled automatically. The speaker to be identified is then required to keep his mouth in the correct position relative to the microphone.

15 Claims, 5 Drawing Figures

DEVICE FOR ADJUSTING A MOVABLE ELECTRO-ACOUSTIC SOUND TRANSDUCER

The invention relates to a device for adjusting a movable electro-acoustic sound transducer to a specific reproducible position relative to the mouth of a speaker.

Many methods for the automatic recognition or identification of speakers and for word recognition employ the long-term spectrum or the variation in time of short-term spectra as the characteristic which is typical of the speaker or word. This characteristic can only be used if the frequency transfer function for the sound signal between the mouth, or even between the vocal chords, and the signal processing system is reproducible, for which purpose the function itself need not be known.

As is known, both the radiation pattern of the mouth and the directional characteristic of microphones are frequency-dependent. If during different speech samples the microphone is held in different positions relative to the mouth, this will result in different frequency transfer functions. The spectrum of the speech signal is also noticeably influnced by the poise of the speaker's head. As a result of these effects a speech signal from a speaker may differ to such an extent from a speech signal previously uttered by the same speaker, in addition to the natural variations when the same sentence is repeated, that reliability of the identification is substantially reduced.

In order to obtain a well-defined position between the mouth of the speaker and the microphone, the speaker can be given specific instructions. However, experience teaches that in a larger system, which is utilized by many different persons, the instructions are not strictly adhered to. Another possibility is to establish a well-defined position of the microphone relative to the mouth by means of a fixed mechanical connection of the microphone to a headset or by means of a simple bracket. However, wearing a headset is experienced as inconvenient by many persons, for example because it may affect head coverings or, generally speaking, because of hygienic reasons. A system to be used by the public in general, as for example in the banking trade, should therefore be capable of unambiguously defining a specific position of the transducer relative to the mouth in a most convenient way.

Therefore, it is an object of the invention to provide a device of the type mentioned in the opening paragraph which guarantees a well defined reproducible position of the microphone relative to the mouth of the speaker as well as a more or less well defined position of the head, without requiring contact between the head and any mechanical parts of the device.

According to the invention this object is achieved in that between the speaker and an object an optical duct connected to the sound transducer is arranged so that the speaker can only fully recognize the object at the location of the specific position of the transducer.

First of all this yields a well defined reproducible adjustment of the device relative to the speaker's eyes and thereby a well defined position of the mouth of the speaker relative to the sound transducer. This adjustment is achieved without any contact with the device, apart from touching by the hands, which is generally accepted without any problems.

The well defined position can also be obtained by a movement of the head. However, it is more effective to arrange the sound transducer with the optical duct so as to be movable. The sound transducer may then be a telephone receiver or a microphone.

In systems for identifying a speaker said speaker enters some data, specifically a code number, into the recognition system in which the speaker's specific characteristics are stored and which compares the instantaneously produced speech signal or criteria derived therefrom with said characteristics. In order to simplify adjustment of the sound transducer it is then effective that the sound transducer and the optical duct be connected to an automatic adjusting device, which upon entry of said data or the code number sets the sound transducer to a position which is characteristic of the speaker.

The sound transducer and the optical duct may be arranged and constructed in various ways, as is defined in the subclaims. In principle the construction of the object is arbitrary. However, since for the purpose of speaker identification in conjunction with a financial transaction and for said transaction itself a display device for transferring data generally is required, the object is suitably a surface with graphical symbols or an opto-electronic display device. In speaker identification systems it is particularly advantageous if the object is a display device and if the device in accordance with the invention furthermore comprises a device for the generation of variable data on the display device. In these cases it is particularly simple to display variable data on the device, as for example a decision taken by the systems such as "recognised", "not-recognised" or variable data in the form of instructions for the speaker to be identified. Such an embodiment of the device in accordance with the invention namely has the following advantages:

1. It ensures a correct position of the mouth of the speaker relative to the microphone.
2. This device enables the method of identifying a speaker to be controlled automatically by projecting instructions on the display device.
3. During the speaker identification process the speaker is forced to remain in the correct position relative to the microphone because the instructions can only be read in this position.

The invention will now be described in more detail with reference to the drawing. In the drawing.

Figure 1:
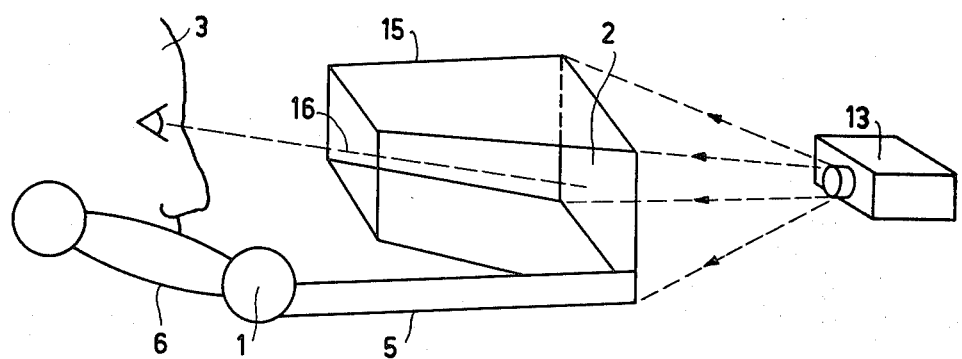
FIG. 1 represents a telephone receiver secured to an optical duct.

In the device in accordance with the invention shown in FIG. 1 an optical duct in the form of a tube 15, which is open at both ends, is secured to a telephone receiver 6 having a microphone capsule 1 via a mount 5, said tube being closed by an object in the form of a display device 2. The axis 16 of the tube 15 is directed at the eye of a speaker 3 who can fully observe display device 2 only in the position shown. The microphone capsule 1 of the receiver is then automatically in a well defined position relative to the mouth of the speaker 3.

Suitably, the device in accordance with the invention further comprises a device 13 for generating variable data on the display device 2. Said device 13 may for example be a slide projector. During the speech recognition process the device 13 may for example project instructions or information for the speaker to be identified onto the display device 2. If the device 13 is then controlled by an automatic processor (not shown in the Figure), this enables the speech recognition process and thus the actions of the speaker to be identified to be controlled automatically by means of instructions on the display device 2.

Since the speaker can only observe these instructions if his eyes are in the indicated position relative to the tube 15 (which position corresponds to the aforementioned desired position of his mouth relative to the microphone capsule 1), he is forced to keep his mouth in the correct position relative to the microphone capsule 1 during the entire speaker identification process, thereby guaranteeing suitable conditions for speaker identification.

Although the device 13 is not shown in the following Figures, it is obvious that such a device may also be used in the embodiments shown in FIGS. 2 to 5.

Figure 2:
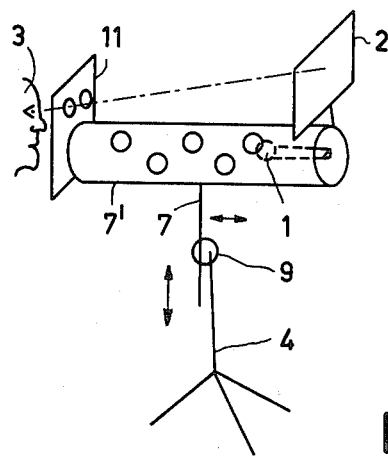
FIG. 2 represents a simple optical duct associated with a microphone.

FIG. 2 shows a sound transducer in the form of a microphone 1 arranged in the tube 7', which is formed with lateral apertures in order to avoid distinct resonances. Alternatively the tube 7' may be formed from a meshed material. A mount 7 is secured to the tube, which mount is fixed to the holder 4 so as to be pivotable and vertically movable, as is indicated by the arrows, via a device 9. The device 9 may for example comprise a motor controlled by an identification system, not shown, which adjusts the rod 7 perpendicularly relative to a position associated with the relative speaker so that the speaker need only apply minor corrections by pivoting the device.

On the one end of the tube 7' there is arranged a diaphragm 11 and on the other end an object 2 in the form of a writing tablet or display device. A speaker 3 located in front of the tube 7' then pivots the tube 7' so that the apertures in the diaphragm 11 just reveal the entire display device 2.

Figure 3:
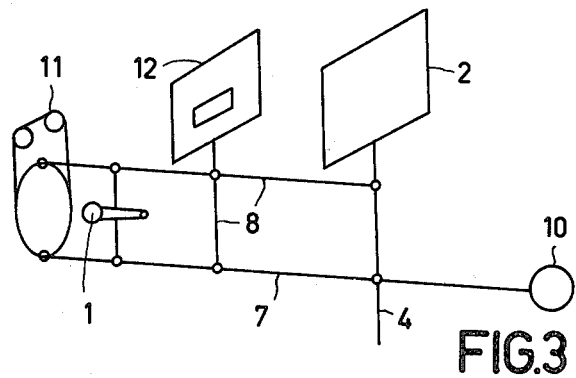
FIG. 3 represents an optical duct comprising two diaphragms.

FIG. 3 shows a different embodiment in which the microphone 1 as well as the diaphragm 11 and a further diaphragm 12 are mounted on a fixed holder 4 via a parallelogram guide by means of the mounts 7 and 8. The lower mount 7 is provided with a counterweight 10 so that after adjustment the adjusted position is maintained. By the use of two diaphragms the tolerance range of the position in which the object 2 can be observed completely through the apertures of the diaphragms 11 and 12 is further reduced, so that the adjustment is more accurate.

Figure 4:
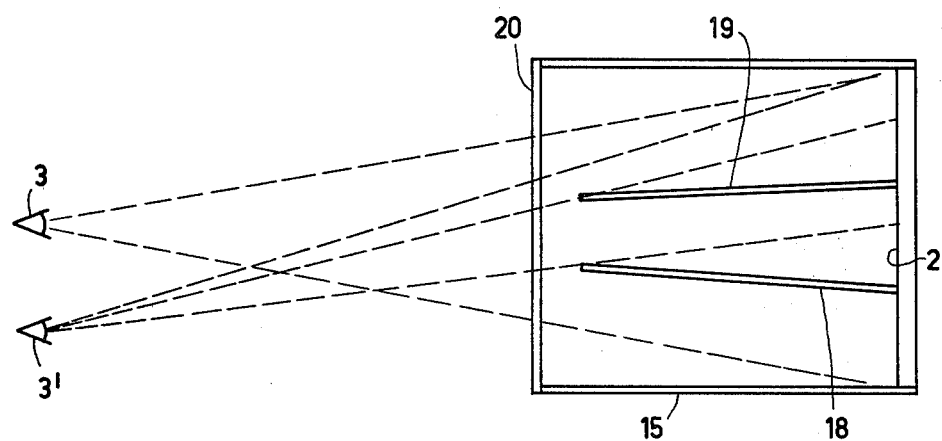
FIG. 4 represents an optical duct in the form of a tube with intermediate walls.

FIG. 4 is a side view of a laterally open tube 15 which surrounds a display device 2. In this tube two intermediate walls 18 and 19 are arranged in the viewing direction. As a result of this, a speaker 3 can completely view the entire surface area of the display device 2. However, a speaker 3' can only observe the display device 2 partly, as shown in the figure.

Between the viewer 3 and the display device 2 there is arranged a phase grating or amplitude grating 20, which also enables the complete display device 2 to be observed from a specific viewing direction only. The intermediate walls 18 and 19 may then be dispensed with.

Figure 5:
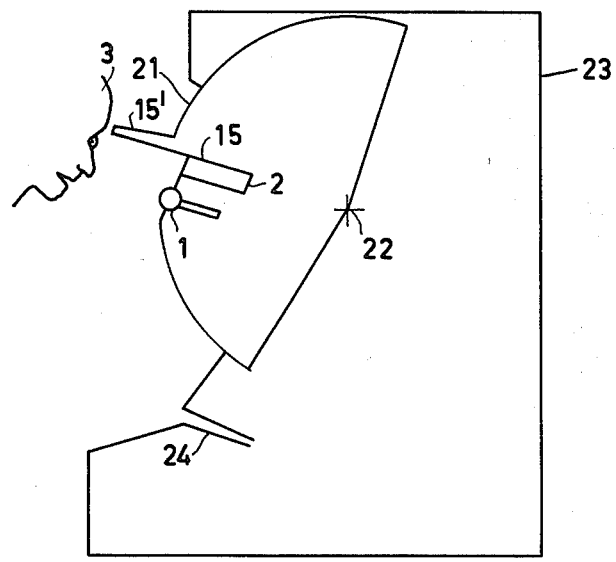
FIG. 5 represents an optical duct with sound transducers secured to a cylinder segment.

In a housing 23, as is shown in FIG. 5, a circularly cylindrical segment 21 is arranged so as to be rotatable about an axis 22. The surface of this circular cylinder is interrupted at one end by a tubular optical duct 15, whose other end is terminated by a display device 2. This display device may also be arranged near the axis 22. Furthermore, there is provided a projecting portion 15' on the surface of the circularly cylinder segment 21 in line with the optical duct 15, which ensures that the speaker 3 remains at a specific distance from the microphone 1, which microphone is arranged underneath the optical duct 15 in the circularly cylindrical segment 21. Underneath the circularly cylindrical segment 21 a slot 24 is formed through which an identification card may be inserted or for example cash may be handed over.

What is claimed is:

1. A device for adjusting a movable electroacoustic sound transducer to a specific reproducible position with respect to the mouth of a speaker comprising, an optical duct connected to the sound transducer and positioned between the speaker and an object such that the speaker can only fully visually observe the object via the optical duct when he is at a specific position in relation to the sound transducer such that a given reproducible frequency transfer function is maintained between the mouth of the speaker and the sound transducer for all separate uses of the device and for different speakers, and wherein the sound transducer and the optical duct are arranged on a pivotable elongate mount so as to be movable in parallel on a fixed holder by means of a parallelogram guide.

2. A device as claimed in claim 1, characterized in that the mount is vertically movable on a fixed holder.

3. A device for adjusting a movable electroacoustic sound transducer to a specific reproducible position with respect to the mouth of a speaker comprising, an optical duct connected to the sound transducer and positioned between the speaker and an object such that the speaker can only fully visually observe the object via the optical duct when he is at a specific position in relation to the sound transducer such that a given reproducible frequency transfer function is maintained between the mouth of the speaker and the sound transducer for all separate uses of the device and for different speakers, and wherein at least the sound transducer and the optical duct are directly connected to a curved surface of a circularly cylindrical segment so as to be integral therewith, said cylindrical segment having an axis about which it is rotatable.

4. A device for adjusting a movable electroacoustic sound transducer to a specific reproducible position with respect to the mouth of a speaker comprising, an optical duct connected to the sound transducer and positioned between the speaker and an object such that the speaker can only fully visually observe the object via the optical duct when he is at a specific position in relation to the sound transducer such that a given reproducible frequency transfer function is maintained between the mouth of the speaker and the sound transducer for all separate uses of the device and for different speakers, and wherein the optical duct comprises at least one optical diaphragm arranged near the speaker and between the speaker and the object.

5. A device as claimed in claim 4 wherein the sound transducer comprises a microphone capsule of a telephone receiver to which the optical duct and the object are secured such that the object is more remote from the speaker than the microphone capsule of the receiver and the optical duct is essentially located between the microphone capsule and the object.

6. A device as claimed in claim 4 wherein the sound transducer and the optical duct are arranged on a pivotable elongate mount.

7. A device for adjusting a movable electroacoustic sound transducer to a specific reproducible position with respect to the mouth of a speaker comprising, an optical duct connected to the sound transducer and positioned between the speaker and an object such that the speaker can only fully visually observe the object via the optical duct when he is at a specific position in relation to the sound transducer such that a given reproducible frequency transfer function is maintained between the mouth of the speaker and the sound transducer for all separate uses of the device and for different speakers, wherein the optical duct is a tube open at both ends and having an axis the extends in the viewing direction, said tube or its extension surrounding the object, said device further comprising intermediate walls within the tube and arranged so as to extend in the viewing direction.

8. A device as claimed in claim 7 wherein the object viewing surface is positioned orthogonally to the longitudinal axis of the tube.

9. A device for adjusting a movable electroacoustic sound transducer to a specific reproducible position with respect to the mouth of a speaker comprising, an optical duct connected to the sound transducer and positioned between the speaker and an object such that the speaker can only fully visually observe the object via the optical duct when he is at a specific position in relation to the sound transducer such that a given reproducible frequency transfer function is maintained between the mouth of the speaker and the sound transducer for all separate uses of the device and for different speakers, and further comprising phase gratings or amplitude gratings arranged in the optical duct.

10. A device as claimed in claim 9 wherein the sound transducer comprises a microphone capsule of a telephone receiver to which the optical duct and the object are secured such that the object is more remote from the speaker than the microphone capsule of the receiver and the optical duct is essentially located between the microphone capsule and the object.

11. A device as claimed in claim 9 wherein the sound transducer and the optical duct are arranged on a pivotable elongate mount.

12. A device as claimed in claim 9 wherein the optical duct is a tube open at both ends and having an axis that extends in the viewing direction, said tube or its extension surrounding the object.

13. A device for visually aligning the mouth of a speaker at a fixed distance from an electroacoustic sound transducer for use in a speaker identification system comprising: an optical duct connected to the sound transducer and positioned between the speaker and an object to be visually observed by the speaker via the optical duct, and means for maintaining the object, the optical duct and the sound transducer in a fixed spatial relationship so that the speaker's mouth is restricted vertically, laterally and longitudinally along three mutually perpendicular axes to a single position such that the object will only be fully visible to the speaker when he is at a specific location that positions his mouth a fixed predetermined distance from the sound transducer, which distance is the same for different speakers and for every repeated use of the device so as to provide a reproducible relatively constant frequency transfer function for an acoustic signal passing between the mouth of the speaker and the sound transducer.

14. A device as claimed in claim 13 wherein the optical duct is a tube open at both ends and having an axis that extends in the viewing direction, said tube or its extension surrounding the object, wherein the object viewing surface is positioned orthogonally to the longitudinal axis of the tube.

15. A device as claimed in claim 13 further comprising means for moving the transducer and the optical duct together so as to maintain the relative position thereof thereby to adjust the device such that the mouth of the speaker is positioned at a precise point with respect to the position of the tranducer when said object is fully visible to the speaker.

* * * * *

UNITED STATES PATENT AND TRADEMARK OFFICE
CERTIFICATE OF CORRECTION

PATENT NO. : 4,445,229
DATED : April 24, 1984
INVENTOR(S) : MANFRED TASTO ET AL

It is certified that error appears in the above-identified patent and that said Letters Patent is hereby corrected as shown below:

IN THE ABSTRACT

Line 10, after "phase" insert --or--
Line 15, after "that" delete --,-- (comma)

IN THE CLAIMS

Claim 7, line 13 change "the" to --that--

Signed and Sealed this

Tenth Day of September 1985

[SEAL]

Attest:

DONALD J. QUIGG

Attesting Officer    Acting Commissioner of Patents and Trademarks - Designate